(12) United States Patent
Rasmusen

(10) Patent No.: US 8,084,876 B2
(45) Date of Patent: Dec. 27, 2011

(54) USE OF ORIENTED GRAIN ROLLING IN A WIND TURBINE GENERATOR

(75) Inventor: Peter Rasmusen, Zamudio (ES)

(73) Assignee: Gamesa Innovation & Technology, S.L., Pamplona (ES)

( * ) Notice: Subject to any disclaimer, the term of this patent is extended or adjusted under 35 U.S.C. 154(b) by 389 days.

(21) Appl. No.: 12/300,011

(22) PCT Filed: May 29, 2007

(86) PCT No.: PCT/ES2007/000313
§ 371 (c)(1),
(2), (4) Date: Mar. 5, 2009

(87) PCT Pub. No.: WO2007/138137
PCT Pub. Date: Dec. 6, 2007

(65) Prior Publication Data
US 2010/0052330 A1    Mar. 4, 2010

(30) Foreign Application Priority Data

May 30, 2006   (ES) .................................. 200601426

(51) Int. Cl.
*H02P 9/04* (2006.01)
(52) U.S. Cl. .......................................... 290/44; 290/55
(58) Field of Classification Search .................... 290/44, 290/55
See application file for complete search history.

(56) References Cited

U.S. PATENT DOCUMENTS

| | | | |
|---|---|---|---|
| 2,774,999 A | | 12/1956 | Mansmann |
| 4,348,605 A | * | 9/1982 | Torok ............................ 310/168 |
| 4,672,252 A | | 6/1987 | Spirk |
| 5,117,142 A | * | 5/1992 | von Zweygbergk ..... 310/156.02 |
| 5,250,867 A | * | 10/1993 | Gizaw ........................... 310/179 |
| 6,133,669 A | * | 10/2000 | Tupper ........................... 310/263 |
| 2002/0070627 A1 | * | 6/2002 | Ward et al. .................... 310/254 |
| 2004/0007933 A1 | * | 1/2004 | Hsu ................................ 310/254 |
| 2004/0119365 A1 | | 6/2004 | Breznak et al. |
| 2004/0160141 A1 | | 8/2004 | Dube |
| 2006/0250042 A1 | * | 11/2006 | Neet et al. ..................... 310/164 |
| 2007/0120369 A1 | * | 5/2007 | Delmerico et al. ............. 290/44 |
| 2007/0281558 A1 | * | 12/2007 | Jansen et al. ...................... 440/6 |

FOREIGN PATENT DOCUMENTS

| | | |
|---|---|---|
| EP | 1 241 350 | 9/2002 |
| EP | 1 276 224 | 1/2003 |
| ES | 2 168 219 | 6/2002 |
| WO | 2005/027301 | 3/2005 |

* cited by examiner

*Primary Examiner* — Dac D Ta
(74) *Attorney, Agent, or Firm* — Ladas & Parry LLP

(57) ABSTRACT

The present invention relates to a wind turbine for generating electric power. The wind turbine includes a generator (105) and a wind turbine rotor (101) for driving the generator (105). The generator includes a generator stator (201) having at least two stator poles (203), and a generator rotor (210) comprising at least two magnetic components (211). At least part of the generator stator (201) contains metal having directional magnetic properties. The generator (105) is connected to the wind turbine rotor (101) via a gearbox (103), in order to increase the rotational speed of the generator (105) in comparison with the rotational speed of the wind turbine rotor (101).

17 Claims, 3 Drawing Sheets

USE OF ORIENTED GRAIN ROLLING IN A WIND TURBINE GENERATOR

FIELD OF THE INVENTION

The present invention relates to the field of electric power generation of a wind turbine and specifically to wind turbine generators.

BACKGROUND OF THE INVENTION

Various types of generators are used for wind turbines for generation of electric power. One commonly used generator is the asynchronous generator which is a high speed generator operating at rotation speeds in the range from 1500 RPM to 3000 RPM. Since the wind turbine rotor of the wind turbine typically rotates with a rotational speed of 20 RPM a gearbox is necessary for increasing the speed from 20 RPM to a least 1500 RPM. Such gearboxes are prone to failures and constitute a high cost of the wind turbine.

Another type of generators used for wind turbines are low-speed direct-drive permanent magnet generators having an operating rotational speed corresponding to the rotational speed of the rotor blades. Therefore, a gearbox is not required when low-speed direct-drive permanent magnet generators are used in a wind turbine. Low-speed direct-drive permanent magnet generators used for wind turbines with 2-3 MW rated power output may have diameters from 5-6 meters and have weights of 5 tons. Generators of this size make transport of the generator to the construction site difficult, especially in case of off-shore wind turbines. Accordingly, replacement of low-speed direct-drive generators in case of failures is a time consuming and costly process.

A first aspect of wind turbines relates to electric power efficiency of generator. Thus, an improvement of the power efficiency may improve the profitability of the investment in wind turbines due to increased power production.

A second aspect of wind turbines relates to the reliability of the generator. Improved reliability of the generator system increases the reliability of the wind turbine, thus increasing the mean-time-between-failure (MTBF) of the wind turbine. The increase of the mean-time-between-failure consequently decreases service costs and increases the power production over time, which is important for the profitability of the investment in wind turbines.

A third aspect of wind turbines relates to the difficulty associated with transporting the components of the wind turbine to the construction site and with replacing components of the wind turbine is case of failures.

WO 00/60719 discloses a low speed generator of the kind being directly coupled to the main shaft of the wind rotor of the windmill. The generator is a stator consisting of a number of stator modules with grain oriented stator sheets that are individual and which may be installed, repaired and dismantled individually and independently of each other. This implies that it is very easy and thereby cheaper to mount the mill, especially at sea, as the stator for the generator can be transported in smaller units, which also makes it easier to assemble the stator in the tower top section. By subsequent repairs and other maintenance of the generator it is not necessary to use large cranes, but it is sufficient to use smaller hoisting devices that may be handled by one or two persons.

SUMMARY OF THE INVENTION

One or more objects of the invention may be obtained with a wind turbine for generating electric power, comprising a generator and a wind turbine rotor for driving the generator, where the generator comprises a generator stator comprising at least two poles, where each pole is provided with windings of wire, and a generator rotor comprising at least two magnetic components, where at least part of the generator stator contains metal having directional magnetic properties, and wherein said generator is connected to the wind turbine rotor via a gearbox, wherein the gearbox during operation of the wind turbine is intended for increasing the rotational speed of the generator in comparison with the rotational speed of the wind turbine rotor.

The invention is particularly, but not exclusively, advantageous for increasing the power efficiency of the wind turbine generator by applying metal, such as iron, having directional magnetic properties in the stator of the wind turbine. The metal having directional magnetic properties may be grain-oriented iron lamination equivalently known as grain-oriented stator sheets. The metal having directional magnetic properties may also be a composite metal or a sintered metal having a grain oriented structure. The metal having directional magnetic properties, such as grain-oriented stator sheets, may both increase the magnetic conductivity and decrease the iron losses so that an increased efficiency of the generator is obtained. The improvement in efficiency may, however, only be of 0.3% to 0.4% for the whole turbine. The additional investment using grain oriented lamination may be around 5000 Euro.

A further advantage may be that the reduced iron losses, obtained by using metal having magnetic directional properties, results in decreased heating of the stator and rotor components, such as permanent magnets being part of the rotor. By reducing the heating of the permanent magnets a degradation of the magnetic field strength of the magnets may be avoided. A degradation of the magnets results in decreased efficiency and eventually requires replacement of the degraded magnets and possibly a replacement of the whole generator.

Furthermore, the invention is particularly, but not exclusively, advantageous for reducing the difficulty associated with transporting the components of the wind turbine to the construction site and with replacing components of the wind turbine in case of failures because of a reduced size of the generator.

The intended rotational speed of the generator during operation of the wind turbine is at least twice the corresponding rotational speed of the wind turbine rotor, preferably at least five times the rotational speed of the wind turbine rotor, possibly at least ten times the rotational speed of the wind turbine rotor, even possibly at least 15 times the rotational speed of the wind turbine rotor.

The generator of the invention may be a medium speed generator having a rotational speed during operation within 30-1000 RPM, preferably within 45-750 RPM or more preferred within 60-500 RPM. It is an advantage that the heating of the magnetic components are kept low due to low iron losses when the rotational speed of the generator is within 30-1000 RPM. The generator of the invention may be a synchronous or an asynchronous generator.

The generator of the wind turbine comprises a stator ring comprising a plurality of stator-ring sections. The stator-ring sections may be made of metal having directional magnetic properties such as grain-oriented stator sheets. It may be an advantage that the stator ring is made of individual stator ring sections so that the high magnetic conductivity of the metal having directional magnetic properties can be utilised. The stator ring may be made by stacking a plurality of layers of the stator-ring sections.

The generator rotor of the wind turbine may comprise at least two magnetic components that are permanent magnets, which magnets are already fully magnetised during periods of time when the wind turbine is not supplied with electric power. A particular advantage of using permanent magnets is that the power producing ability of the generator is independent of an external electric power supply.

Alternatively, the generator rotor of the wind turbine may comprise at least two magnetic components that are magnets being magnetised during the periods of time when the wind turbine is supplied with electric power, and which are being gradually de-magnetised during the periods of time when the wind turbine is not supplied with electric power.

In another alternative, the generator rotor of the wind turbine may comprise at least two magnetic components that are electromagnets being magnetised during periods of time when the wind turbine is supplied with electric power.

Various types of magnetic components can be used, that is, magnetic components being preliminary fully magnetised and magnetic components that are magnetised during the period when wind turbine is connected to the utility grid. Each type of magnetic components has advantages over the other types such as advantages of cost, efficiency and reliability.

The wind turbine may comprise a gearbox such as a two-stage gearbox. It may be an advantage that the gearbox is a two-stage gearbox since a two stage gearbox is less complex than a multi-stage gearbox and, therefore, more reliable.

The generator of the wind turbine may be a synchronous generator. In an alternative, the generator of the wind turbine may be an asynchronous generator.

The wind turbine may comprise at least two frequency converters, where each of the at least two stator-poles are connected one-to-one to corresponding at least two frequency converters.

Alternatively, the wind turbine may comprise at least one frequency converter, where each of the at least two stator-poles are connected to a single frequency converter common to the at least two stator-poles.

Accordingly, the stator-poles may be connected one-to-one to corresponding frequency converters or the stator-poles may be connected to a single frequency converter, where each connection method has advantages over the other method such as advantages of cost, efficiency and reliability. Also, a fraction of the total number of stator poles, such as two, three or more stator-poles, may be connected to a single frequency converter.

At least part of the generator rotor of the wind turbine may contain metal having directional magnetic properties, such as grain-oriented lamination. It may be an advantage using grain-oriented lamination in the generator rotor in order to reduce the magnetic losses in the generator rotor.

The wind turbine may a type comprising already fully magnetised magnets, which magnets are structurally integrated with a synchronous or asynchronous induction generator, and which magnets are magnetically independent from stator windings of the synchronous or asynchronous induction generator.

Alternatively, the wind turbine may be a type comprising magnets being magnetised by the generator, which magnets are structurally integrated with a synchronous or asynchronous induction generator, and which magnets are magnetically dependent of any stator windings of the synchronous or asynchronous induction generator.

Different types of generators may be used in the wind turbine, each of them having advantages over the other, such as generators comprising magnets that are structurally integrated with a synchronous or asynchronous induction generator.

The outer diameter of the generator stator of the wind turbine may be between 3 and 4 meters, preferably between 2 and 3 meters, and more preferred between 1 and 2 meters. It may be an advantage that the diameter of the generator stator is small, such as a diameter between 1 and 2 meters, since transportation of a generator with a diameter between 1 and 2 meters is less requiring that transportation of a generator with a diameter between 5 and 6 meters.

A generator, where said generator comprises a generator stator comprising at least two poles, where each pole is provided with windings of wire, and a generator rotor comprising at least two magnetic components, where at least part of the generator stator contains metal having directional magnetic properties, may advantageously be used in a wind turbine comprising a gearbox, wherein the gearbox during operation of the wind turbine is intended for increasing the rotational speed of the generator in comparison with the rotational speed of the wind turbine rotor.

DETAILED DESCRIPTION OF AN EMBODIMENT

Figure 1:
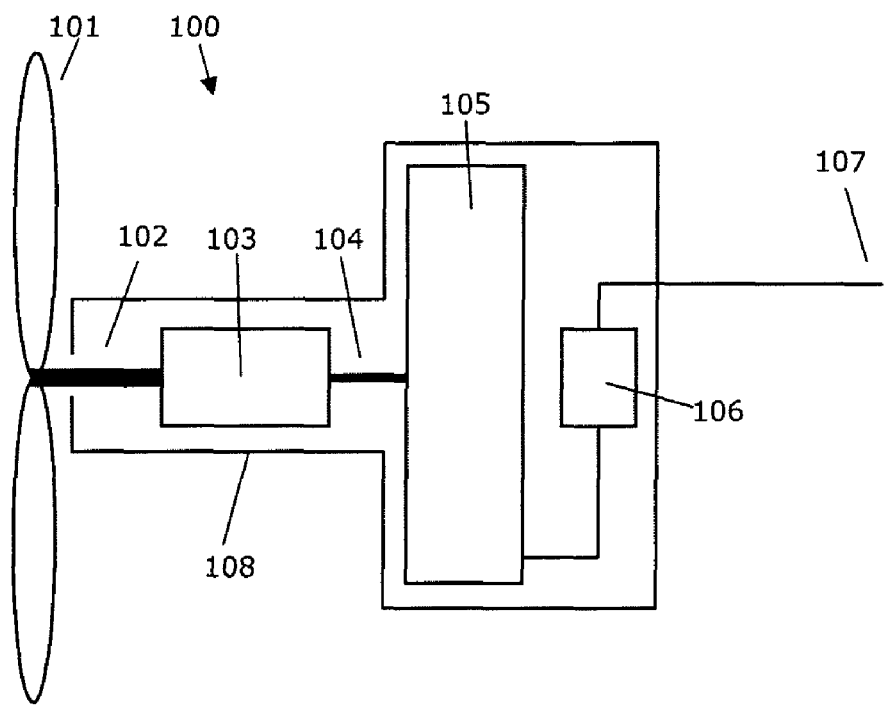
FIG. 1 is a principal sketch of a nacelle of a wind turbine comprising a wind turbine, a gearbox 103 and a generator.

FIG. 1 is a principal sketch of a nacelle 100 of a wind turbine. The wind turbine further comprises a wind turbine rotor 101 which is connected to a gearbox 103, such as a two-stage gearbox, via a slow speed shaft 102. The gearbox 103 converts the slow rotational speed of the slow speed shaft 102 to a medium rotational speed of a medium speed shaft 104.

The medium speed shaft 104 is connected to a generator 105 for transferring the torque of the medium speed shaft 104 to the generator 105. The generator 105, which may be a synchronous generator, generates electric power, which is inputted to the frequency converter unit 106 which outputs electric power to the utility grid 107. The components of the nacelle 100 are enclosed by a housing 108.

The rotational speed of the slow speed shaft 102 during operation may be within 0-40 RPM (rotations per minute) depending on wind velocity, size of wind turbine, and whether the wind turbine is in a start-up phase or is running in a normal operating condition. A typical rotational speed of the slow speed shaft 102 is within the range from 8-22 RPM. The rotational speed of the slow speed shaft 102 is converted by the gearbox 103 so that the rotational speed of the medium speed shaft 104 during operation is within the range from 50-600 RPM. Accordingly, the rotational speed of the generator 105 is also within the range from 50-600 RPM. Generators for use in wind turbines operating with rotational speeds in the range from 50-600 RPM are known by the skilled person as medium speed generator, not to be confused with high speed generators for wind turbines which have rotational speeds within the range from 1500-3000 RPM.

Other types of generators used for wind turbines, known as low-speed direct-drive generators, operate with rotational speeds during operation within the range from 10-40 RPM and are typically connected directly to the wind turbine rotor 101 without the use of a gearbox. Low-speed direct-drive generators have significant larger stator diameters than medium speed generator. For instance 2-3 MW and 3-4 MW low-speed direct-drive generators may have a stator diameters in the range of 3-4 meters and 5-6 meters, respectively, whereas a 2-3 MW medium speed generator may have a stator diameter of only 1-2 meters.

Low-speed direct-drive generators with diameters in the range of 5-6 meters and weights of 20 ton complicates the transport of the generator to the construction site, and they complicates replacement of the generators, especially in case of off-shore wind turbines, due to the required load capacity of the cranes used for lifting the generator.

Figure 2:
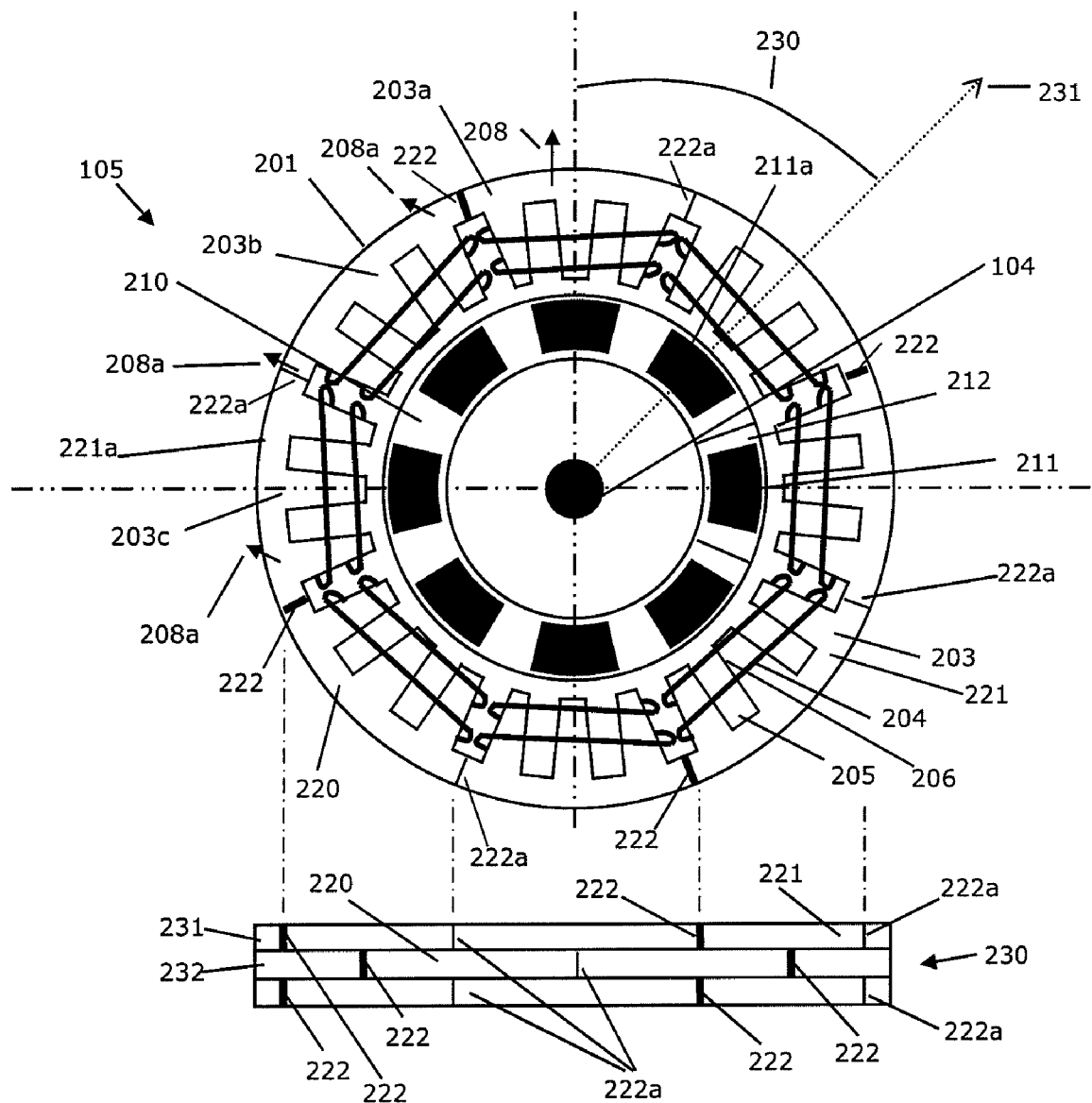
FIG. 2 is a principal sketch of a generator comprising a generator rotor and a generator stator.
Figure 3:
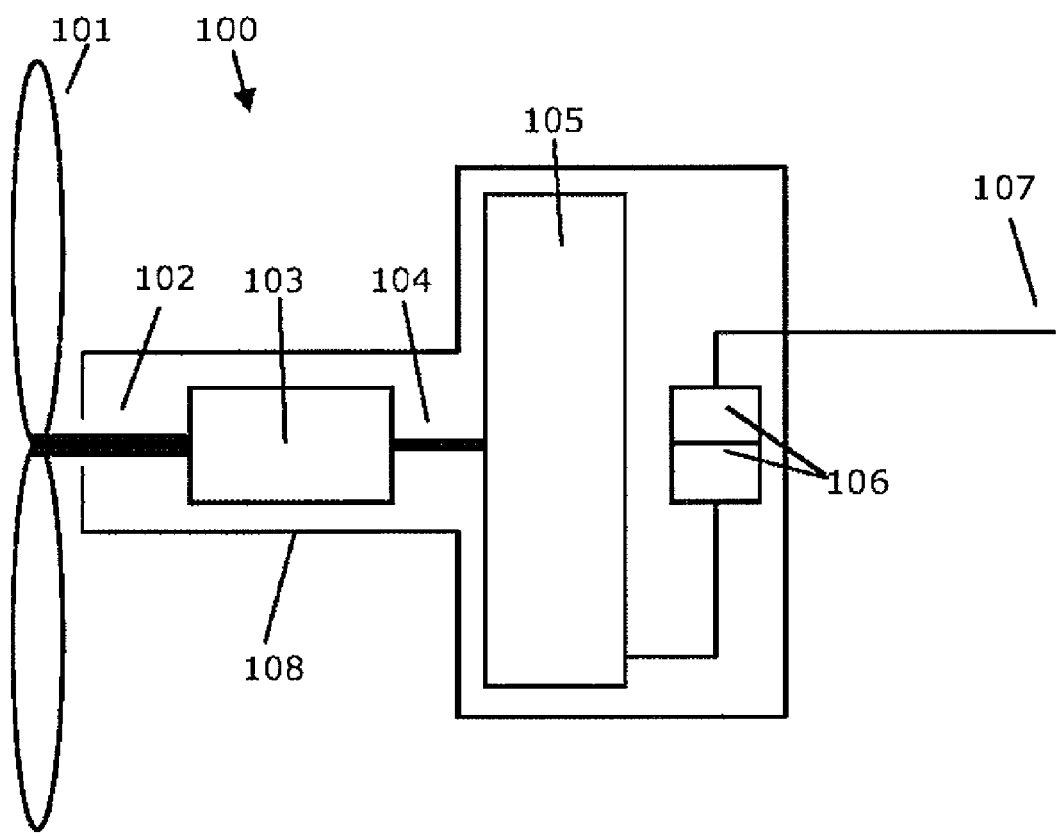
FIG. 3 is an embodiment of the nacelle sketch of a wind turbine comprising a wind turbine, a gearbox 103, and a generator and at least two converters.

FIG. 2 is a principal sketch of the generator 105. The medium speed shaft 104 is connected to the generator rotor 210 for transmission of the rotations of the medium speed shaft 104 to the generator rotor 210. The rotor contains a number of magnetic components 211. Each magnetic component 211 constitutes a rotor pole 212, possibly in combination with other components such as rotor sheet metal or grain-oriented rotor sheet metal. The magnetic components 211 may be integrated or otherwise provided in or on a metal structure, such as rotor sheet metal, which metal structure in combination a magnetic component 211 constitutes the rotor pole 212. The magnetic components 211, alternatively the rotor poles 212, may be supported by mounting them on a disk shaped rotor supporting ring, preferably being made of a metal. Preferably, the rotor sheet metal has directional magnetic properties, such a grain oriented lamination, however, the rotor sheet metal may alternatively be made of rotor sheet metal without directional magnetic properties. The number of magnetic components 211 may be within the interval 8-80, preferably within the interval 10-40 or more preferred within the interval 10-24.

The magnetic components 211 may be permanent magnets or the magnetic components 211 may be a semi-permanent magnets that are magnetised during operation of the wind turbine, that is, the electric power generated by the generator 105, alternatively the utility grid 107, is used for magnetising the semi-permanent magnets. Furthermore, the magnets 211 may be made from super conductive coils or they may be electromagnets, such as coils that are magnetised via electric power from a utility grid or via electric power produced by the generator 105.

The generator stator 201 of the generator 105 comprises a stator ring 220 where the stator ring is made of stator-ring sections 221 made of stator sheets, such as grain oriented lamination. Individual stator-ring sections 221 are indicated by edges 222. The stator ring 220 is made by stacking stator-ring sections 221 as shown by the side view 230. Thus, the stator-ring sections 221 of the first layer 231 are shifted in relation to the stator-ring sections of the second layer 232.

The generator stator 201 of the generator 105 further comprises at least two stator poles 203 where each stator pole 203 has a winding 204. The winding 204 may be made in slots 205 in the stator-ring sections 221. Each pole 203 comprises at least two slots 205 and at least one tooth 206. The teeth 206 of the generator stator 201 establish the magnetic connection to the magnetic components 211 of the generator rotor 210.

Each individual stator ring section 221 comprises one or more stator poles 203. For the purpose of illustration, FIG. 2 shows both a stator ring section 221 comprising one pole 203 as well as a stator ring section 221a comprising two stator poles 203b and 203c. For practical utilisation, most often all stator ring sections 221 will have the same number of poles, for instance the generator stator 201 of FIG. 2 could have illustrated four stator ring sections 221a each comprising two stator poles 203b and 203c. Alternatively, the generator stator 201 of FIG. 2 could have illustrated eight stator ring sections 221 each comprising one stator poles 203. The edges 222a show the additional edges 222a in the illustrative case of a generator stator 201 comprising eight stator ring sections 221.

The number of rotor poles 212 may be different from the number of stator poles 203 when the stator 201 has fractional slot windings or asymmetric slot windings. The number of rotor poles 212 may also be equal from the number of stator poles 203.

The grain direction 208 of the grain oriented lamination in stator pole 203a is indicated by the arrow 208. Thus, the arrow 208 shows the direction where the magnetic loss in the stator pole 203a is minimal. When the direction 231 of the magnetic field of the magnetic element 211a is parallel with grain direction 208, and angle 230 quals zero, the magnetic loss in a tooth 206 of the stator pole 203a is minimal. Accordingly, the magnetic loss is minimised in the tooth 206 having a grain direction 208 when the direction 231 of the magnetic field is parallel with the grain direction 208. Clearly, it should be understood that the magnetic field has a radial direction in a tooth 206, whereas the magnetic field bends in the outer periphery of the stator ring sections 221. However, since the density of the magnetic field is lower in the outer periphery of the stator ring sections 221 as compared to the density of the magnetic field in the teeth 206, the magnetic loss in the outer periphery of the stator ring sections 221 is still low. When the generator rotor 210 is rotated a small angle 230, such as 5 degrees, the direction 231 of the magnetic field of the magnetic element 211a in a tooth 206 deviates from the grain direction 208 with a small angle 230, such as 5 degrees, with the result that the grain oriented lamination in stator pole 203a exhibits an increased magnetic loss, as compared to the situation when the direction 231 of the magnetic field is parallel with the grain direction 208. However, since the angle 230 is small (for instance 5 degrees), the increased magnetic loss is not significant.

By dividing the first layer 231 of the generator stator 201 up into at least four stator-ring sections 221 it is achieved that the deviation between the direction 231 of the magnetic field of the magnetic element 211a or another magnetic element 211 and the grain direction 208 of any of the stator-ring sections 221 does not exceed a maximum angle 230, so that the magnetic loss is not significant. To be more specific the maximum angle 230 may be less than 20 degrees, preferably less than 15 degrees, and more preferred less than 10 degrees.

As example, by dividing each layer 231 of the generator stator 201 into fifteen stator-ring sections 221 the deviation between the direction 231 of the magnetic field of the magnetic element 211a or any other magnetic element 211 and the grain direction 208 of any of the stator modules 220 does not exceed a maximum angle 230 of 12 degrees.

The advantage of using grain oriented stator sheets in a generator 105, where the generator stator 201 is divided into stator-ring sections 221 made of stator sheets having directional magnetic properties, is an increased efficiency of the generator 105 compared to another generator being identical except for using stator sheets without directional magnetic properties. Accordingly, an increased power production of 0.3% to 0.4% is achievable compared to the generator where the increased magnetic conductivity of grain oriented stator sheets is not utilised. Such an increased production may compensate for the increased costs of using grain oriented stator sheets.

The magnetic loss in the stator-ring sections 221 depend on the rotational speed of the medium speed axis. In the lower range of 50 RPM of the medium speed shaft 104 the magnetic losses are small due to small eddy currents in the stator sheets, whereas in the upper range of 600 RPM the magnetic losses are somewhat greater due to increased eddy currents.

The magnetic losses unavoidably result in generation of heat due to iron losses in the stator sheets. In the lower range of 50 RPM of the medium speed axis, the heat generation is small due to low iron losses, whereas in the upper range of 600 RPM the heat generation is correspondingly greater due to increased iron losses.

The heat generated in the generator stator 201 causes a heating of the generator rotor 210 and the magnets 211. In particular when permanent magnets 211 are used it is important keep the temperature of the permanent magnet 211 below 190 degrees Celsius, preferably below 150 degrees Celsius and more preferred below 110 degrees Celsius. Temperatures above a certain maximum temperature limit, such as the Curie temperature of 300 degrees Celsius, will degrade the magnetic field of the permanent magnets. However, since the generator operates in the medium speed velocity range from 50 RPM to 600 RPM the temperature typically does not exceed a temperature which causes degradation of the permanent magnets such as a temperature above 190 degrees Celsius. The situation is different for high speed generators having rotational velocities in the range from 1500 RPM to 3000 RPM where the high rotational velocity may generate temperatures above 190 degrees Celsius in the generator rotor 210 which will degrade the performance of the permanent magnets 211.

If the stator is not divided or only divided into two equal-sized stator-ring sections 221 the advantage of using stator sheet metal having directional magnetic properties is not achieved. Thus, if the stator ring 220 is not divided or only divided into two equal-sized stator-ring sections 221 the maximum deviation between the direction 231 of the magnetic field of the magnetic element 211a or any other magnetic element 211 and the grain direction 208 of any of the one or two stator modules 220 will be 90 degrees. Typically, a 90 degrees deviation between the magnetic field and the grain direction in the stator sheet metal results in a 30% decrease of the magnetic saturation. Thus, whereas a magnetic field of for instance 1.7 Tesla is transferred in a pole 203 when the angle 230 equals zero, a magnetic field of only 1.2 Tesla is transferred in a pole 203 when the angle 230 equals 90 degrees, due to the magnetic saturation. Therefore, in cases where the stator modules are not divided or only divided into two halves, the advantage of the ideal magnetic properties when direction 231 of the magnetic field of a magnet 211 is parallel with grain direction 208 is more than offset by the non-ideal magnetic properties when direction 231 of the magnetic field of a magnet 211 is perpendicular to the grain direction 208.

Stator-ring section 221a comprises two stator poles 203b and 203c being provided in the same stator sheet metal characterised by the same grain orientations 208a. The deviation between the direction 231 of the magnetic field of a magnetic element 211 in a tooth 206 and the grain direction 208a of the stator module 220 is smaller in a tooth 206 close to the centre of the stator-ring section 221a than in a tooth 206 close to the edges of the stator-ring section 221a. Thus, the average magnetic loss in teeth 206 near the edges of the stator-ring section 221a is greater than the magnetic loss in teeth 206 near the centre of the stator-ring section 221a.

The electrical outputs, such as three-phase outputs, of the individual stator poles 203 may be inputted to individual frequency converters for converting the frequency and/or the voltage of the electric power generated by the generator 105 for adaptation to the frequency and voltage of the utility grid 107. Alternatively, the electrical outputs of the individual stator poles 203 may be combined, for instance in a central terminal box, and the combined electric outputs from the central terminal box may be inputted to a central frequency converter 106 for converting the frequency and/or the voltage.

The invention claimed is:

1. A wind turbine for generating electric power, comprising a generator (105) and a wind turbine rotor (101) for driving the generator (105), wherein the generator (105) comprises:
    a generator stator (201) comprising at least two stator poles (203), wherein each stator pole (203) is provided with windings (204) of wire, wherein at least part of the generator stator (201) contains metal having directional magnetic properties, and wherein an outer diameter of the generator stator (201) is between 1 and 4 meters;
    a generator rotor (210) comprising at least two magnetic components (211); and
    a stator ring (220) comprising a plurality of stator-ring sections (221);
    wherein said generator (105) is connected to the wind turbine rotor (101) via a gearbox (103), wherein the gearbox (103) during operation of the wind turbine increases the rotational speed of the generator (105) in comparison with the rotational speed of the wind turbine rotor (101), between 2 and 15 times; and
    the generator (105) is a medium speed generator having a rotational speed during operation within 30-1000 RPM.

2. A wind turbine according to claim 1, where the rotational speed of the generator (105) during operation of the wind turbine increases between two and ten times the rotational speed of the wind turbine rotor (101), and at least five times the rotational speed of the wind turbine rotor (101).

3. A wind turbine according to claim 1, wherein the at least two magnetic components (211) are permanent magnets, which magnets are already fully magnetized during periods of time when the wind turbine is not supplied with electric power.

4. A wind turbine according to claim 1, wherein the at least two magnetic components (211) are magnets being magnetized during periods of time when the wind turbine is supplied with electric power, and which are being gradually de-magnetized during periods of time when the wind turbine is not supplied with electric power.

5. A wind turbine according to claim 1, wherein the at least two magnetic components (211) are electro-magnets being magnetized during periods of time when the wind turbine is supplied with electric power.

6. A wind turbine according to claim 1, wherein the gearbox (103) is a two-stage gearbox.

7. A wind turbine according to claim 1, wherein the generator (105) is a synchronous generator.

8. A wind turbine according to claim 1, wherein the wind turbine further comprises at least two frequency converters (106) and wherein each of the at least two stator-poles (203) are connected one-to-one to corresponding at least two frequency converters.

9. A wind turbine according to claim 1, wherein the wind turbine further comprises at least one frequency converter (106) and wherein each of the at least two stator-poles (203) is connected to a single frequency converter (106) common to the at least two stator-poles (203).

10. A wind turbine according to claim 1, wherein at least part of the generator rotor (210) contains metal having directional magnetic properties.

11. A wind turbine according to claim 1, wherein the generator (105) is a type comprising already fully magnetized magnets (211), which magnets are structurally integrated with a synchronous or asynchronous induction generator (105), and which magnets are magnetically independent from stator windings (204) of the synchronous or asynchronous induction generator.

12. A wind turbine according to claim 1, wherein the generator (105) is a type comprising magnets (211) being magnetized by the generator, which magnets are structurally integrated with a synchronous or asynchronous induction generator (105), and which magnets are magnetically dependent of any stator windings (204) of the synchronous or asynchronous induction generator.

13. A wind turbine according to claim 1, wherein the outer diameter of the generator stator (201) is between 3 and 4 meters.

14. A wind turbine according to claim 1, wherein the generator (105) is a medium speed generator having a rotational speed during operation within 45-750 RPM.

15. A wind turbine according to claim 1, wherein the generator is a medium speed generator having a rotational speed during operation within 60-500 RPM.

16. A wind turbine according to claim 1, wherein the outer diameter of the generator stator (201) is between 2 and 3 meters.

17. A wind turbine according to claim 1, wherein the outer diameter of the generator stator (201) is between 1 and 2 meters.

* * * * *